(12) United States Patent
Kato et al.

(10) Patent No.: US 6,618,177 B1
(45) Date of Patent: Sep. 9, 2003

(54) LIGHT SPACE-TRANSMISSION DEVICE

(75) Inventors: Tetsuro Kato, Kanagawa (JP); Yujiro Ito, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/364,503

(22) Filed: Jul. 30, 1999

(30) Foreign Application Priority Data

Aug. 10, 1998 (JP) .......................................... P10-226340

(51) Int. Cl.$^7$ ............................................... H04B 10/00
(52) U.S. Cl. ...................................... 359/159; 359/172
(58) Field of Search .................................. 359/159, 154, 359/152, 172

(56) References Cited

U.S. PATENT DOCUMENTS 5,448,391 A * 9/1995 Iriyama et al. ............. 359/159
5,689,354 A * 11/1997 Orino ....................... 359/172

* cited by examiner

Primary Examiner—Thomas Mullen
(74) Attorney, Agent, or Firm—Bell, Boyd & Lloyd, LLC

(57) ABSTRACT

A light space-transmission device includes a light beam transmitting block for modulating a light beam with information signal and for transmitting the light beam, a first luminous-flux-diameter converting part for enlarging the luminous-flux-diameter of the light beam that is sent from the light beam transmitting block and for transmitting the light beam, a second luminous-flux-diameter converting part for enlarging the luminous-flux-diameter of the light beam that is sent from the first luminous-flux-diameter converting part and for transmitting the light beam. An optical-axis correcting portion is inserted into the optical path of the light beam between the first luminous-flux-diameter converting part, and the second luminous-flux-diameter converting part and controls the angle of the optical axis of the light beam thrown to the second luminous-flux-diameter converting part.

8 Claims, 2 Drawing Sheets

LIGHT SPACE-TRANSMISSION DEVICE

BACKGROUND OF THE INVENTION

1. Field of the Invention

This invention relates to a light space-transmission device, and more particularly, is suitably applicable to, for instance, a light space-transmission device for enlarging the luminous-flux-diameter of the light beam by means of a light beam expander and for transmitting a light beam.

2. Description of the Related Art

A light space-transmission device has been conceived wherein information signals are transmitted via a light beam. In such a light space-transmission device, a laser diode is driven with the stated information signal, and the luminous-flux-diameter of a light beam that is emitted from the laser diode is enlarged by means of a light beam expander, and the light beam is transmitted to an opposed other light space-transmission device that is the partner of the communication. Then, the other light space-transmission device receives this light beam with a light receiving element, and demodulates the output signal of the light receiving element to obtain the information signal; in this way, the information signal is transmitted via the light beam. In the same way, information signals can be transmitted from the other light space-transmission device via light beams.

In such a light space-transmission device, it is required to perform optical-axis correction so as to match the optical axis of the light beam that is beamed toward the light space-transmission device of the partner to the light space-transmission device of the partner; various methods are conceivable for performing this optical-axis correction.

For instance, such an optical-axis correcting method can be conceived that the light space-transmission device is supported with a gimbal that is movable upwards, downwards, leftward and rightward and the direction of the entire light space-transmission device is varied; but, in this case, there are such problems that whole device becomes larger and more complex one, and the speed of response of the optical-axis correction becomes slower, because it is needed to move the entire light space-transmission device.

Besides, such a method for correcting the optical-axis of the light beam can be conceived that the light beam emitted from a light beam expander is reflected with a servo mirror, and the angle of this servo mirror is controlled; but, in this case, there are such problems that the reflecting surface of the servo mirror becomes larger, and the speed of response of the optical-axis correction becomes slower, because the servo mirror is required to reflect the entire light beam whose luminous-flux-diameter has been enlarged by the light beam expander.

Besides, such a method can be conceived that the optical axis of a light beam that is not yet thrown into the light beam expander is corrected by means of a servo mirror, and this light beam whose optical axis has been corrected is expanded with the light beam expander and then emitted. Referring to FIG. 1, a light space-transmission device generally designated as 1 is comprised of an optical block 10 for transmitting and receiving light beams, a light beam expander 30 for enlarging or diminishing the luminous-flux-diameter of the light beam, and a servo mirror 20 for controlling the angle of the optical axis of the light beam.

The light space-transmission device 1 receives a reception light beam L2 that comes from a light space-transmission device (not shown) of the partner with the light beam expander 30, diminishes the luminous-flux-diameter of the reception light beam L2 by the use of lenses 32 and 31, and sends it to the optical block 10 via a mirror 21 of the servo mirror 20.

In the the optical block 10, the reception light beam L2 is passed through a beam splitter M1, and then a part of the reception light beam L2 is reflected by a beam splitter M2 and brought into convergence on a position detecting element 13 via a lens 16; the rest of the reception light beam L2 is passed through the beam splitter M2, and converged on a light receiving element 12 via a lens 15. And, the light space-transmission device 1 performs photoelectric conversion of the converged reception light beam L2 into an electric signal by means of the light receiving element 12, and then decodes the electric signal with a signal processing circuit (not shown) of the subsequent stage, thereby restoring the information signal.

In transmitting light beams, the light space-transmission device 1 drives a laser diode 11 of the optical block 10 with the information signal that is supplied from the exterior, transforms a transmission light beam L1 that is emitted from the laser diode 11 into a parallel ray by means of a lens 14, reflects the transmission light beam L1 with a beam splitter M1, and further reflects the transmission light beam L1 with the servo mirror 20, so as to throw it to the light beam expander 30. The light beam expander 30 enlarges the luminous-flux-diameter of the transmission light beam L1 by the use of the lenses 31 and 32, and throws the transmission light beam L1 toward the light space-transmission device of the partner. In this manner, the light space-transmission device 1 transmits and receives the information signals through the medium of the transmission light beam L1 and the reception light beam L2.

At this time, the light space-transmission device 1 aligns the optical axes of the transmission light beam L1 and the reception light beam L2, so as to perform optical-axis correction for adjusting the optical axis of the transmission light beam L1 to the optical wireless device of the partner. The position detecting element 13 sends the light receiving position information of the reception light beam L2 at the light receiving plane of the position detecting element 13 to a controlling division (not shown). The controlling division calculates the difference between the actual light receiving position and the light receiving position (reference position) of the reception light beam L2 that is in such a state that the optical axes of the transmission light beam L1 and the reception light beam L2 have been aligned, drives the mirror 21 on the basis of this difference, and adjusts the light receiving position of the reception light beam L2 such that it coincides with the reference position, thereby achieving the optical-axis correction.

By locating the servo mirror 20 between the optical block 10 and the light beam expander 30, the mirror 21, as a result, the speed of response can be improved.

The angle of light which is emitted from the light beam expander becomes a value that is given by dividing the angle of the light thrown into the light beam expander by the enlargement ratio of the light beam expander. That is, as shown in FIG. 2, in the case where the angle of the mirror 21 is increased by a degree, the optical axis of the light beam that is thrown into the light beam expander 30 increases by $2\alpha$ degrees, and, provided that the enlargement ratio of the light beam expander 30 is X, the change of angle of the optical axis of the light beam that is emitted from the light beam expander 30 becomes $2\alpha/X$ degrees. For instance, if the enlargements ratio of the light beam expander 30 is 16 times, and the optical axis correcting angle range that is required for the light space-transmission device 1 is ±1 degree, then ±8 degrees is required for for the rotational range of the mirror 21. In the case where the servo mirror 20 is placed between the optical block 10 and the light beam expander 30 in this way, such problems still exist that the required rotational-range of the mirror 21 becomes wider and, therefore, the servo mirror 20 becomes larger and more complex.

SUMMARY OF THE INVENTION

In view of the foregoing, an object of the invention is to provide a light space-transmission device which has a simple constitution and a wide range of optical-axis correction.

The foregoing object and other objects of the invention have been achieved by the provision of a light space-transmission device which has transmitting means for transmitting a light beam modulated with a predetermined information signal to another light space-transmission device spaced at a predetermined distance, light receiving means for receiving a transmission light transmitted from another light space-transmission device spaced at a predetermined distance as a reception light beam, a plurality of luminous-flux-diameter converting means for converting the luminous-flux-diameters of said transmission light beam and said reception light beam, optical axis correcting means for controlling the angle of the optical axes of said transmission light beam and said reception light beam.

The nature, principle and utility of the invention will become more apparent from the following detailed description when read in conjunction with the accompanying drawings in which like, are designated by like reference numerals or characters.

DETAILED DESCRIPTION OF THE EMBODIMENT

Figure 1:
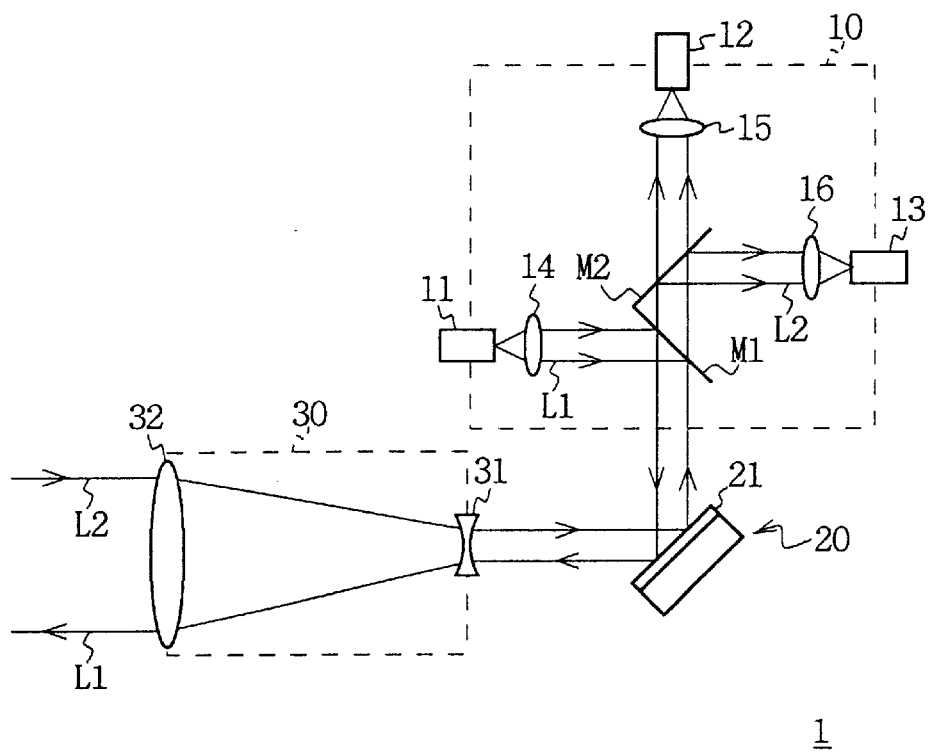
FIG. 1 is a schematic diagram showing a light space-transmission device.
Figure 2:
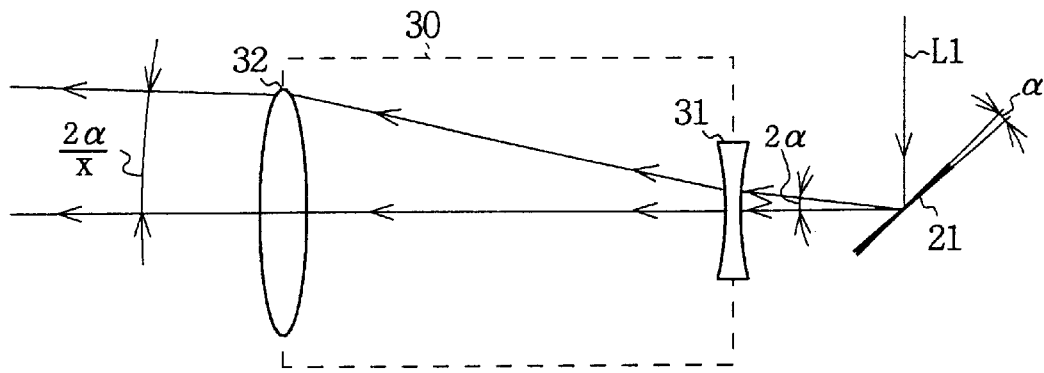
FIG. 2 is a schematic diagram showing the relation between the angle of incidence and the angle of outgoing, concerning the light beam expander.
Figure 3:
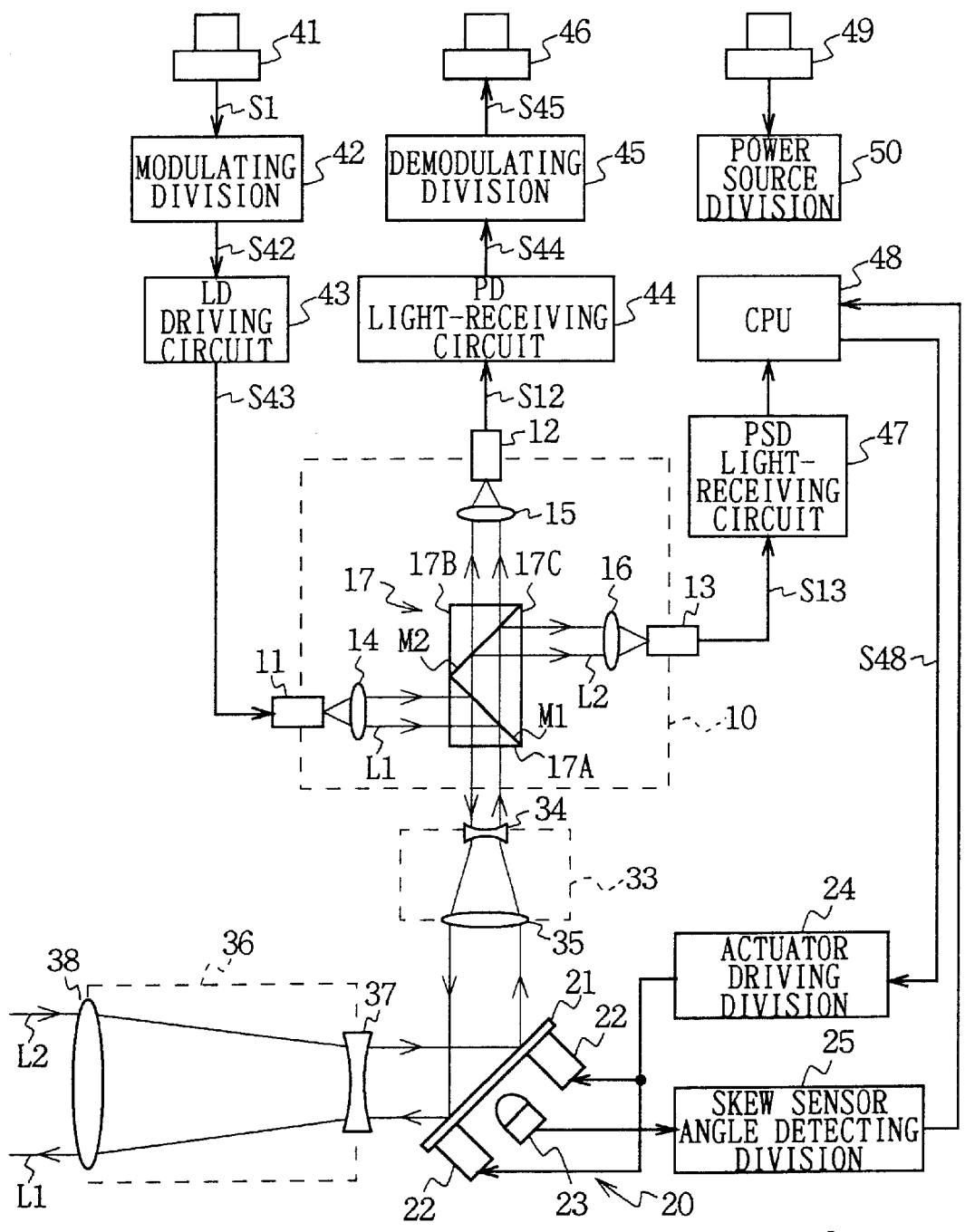
FIG. 3 is a schematic diagram showing an embodiment of the light space-transmission device according to the present invention.

Preferred embodiment of the present invention will be described with reference to the accompanying drawings:

Referring to FIG. 3, which has the same reference numerals as those of FIG. 1 on its portions corresponding to the portions of FIG. 1, a light space-transmission device generally designated as 2 includes an optical block 10 for transmitting/receiving light beams, a servo mirror 20 for controlling the angle of the optical axis of the light beam, and light beam expanders 33 and 36 that are the luminous-flux-diameter converting means for, as an example increasing the luminous-flux-diameter of the light beam by 4 times or reducing it by a factor of 4.

The servo mirror 20, which is the optical-axis correcting means, is comprised of the mirror 21 that is a planar mirror, an actuator 22 for rotationally driving the mirror 21, and a skew sensor 23; the mirror 21 is supported by a mirror supporting division (not shown) in a freely-rotatable state.

The skew sensor 23 delivers the angle information of the mirror 21 to a central processing unit (CPU) 48 via a skew sensor angle detecting division 25.

A power source division 50 converts a current that is supplied from a power source (not shown) via a power source connector 49 into the stated voltage, and supplies the current to every part that composes the light space-transmission device 2.

The light space-transmission device 2 receives a reception light beam L2 that comes from a light space-transmission device (not shown) of the partner by the light beam expander 36. The light beam expander 36 reduces the luminous-flux-diameter of the reception light beam L2 by a factor of 4 with lenses 38 and 37, and sends the beam L2 to the light beam expander 33 via the servo mirror 20. The light beam expander 33 further reduces the luminous-flux-diameter of the reception light beam L2 by a factor of 4 through lenses 35 and 34, and sends the beam L2 to a prism 17 included in the optical block 10. Thus, the light space-transmission device 2 reduces the diameter of the incident luminous flux of the reception light beam L2 by a factor of 16, by the use of the light beam expander 36 and the light beam expander 33.

The prism 17 is comprised of a first right-angle prism 17A and a second right-angle prism 17B whose sizes are equal, and a third right-angle prism 17C; the inclined planes of the first right-angle prism 17A and the second right-angle prism 17B and the right-angled surface of the third right-angled isosceles triangle prism 17C are formed such that they become uniform. And, the prism 17 is formed by gluing each inclined plane of the first and the second right-angle prisms 17A and 17B to each right-angled surface of the right-angled isosceles triangle prism 17C respectively, such that the polarization beam splitter M1 is formed at the bonded surface of the first right-angle prism 17A and the third right-angle prism 17C, and the beam splitter M2 is formed at the bonded surface of the second right-angle prism 17B and the third right-angle prism 17C. The polarization beam splitter M1 reflects the light beam in the right-angle direction or allows it to travel in a straight line, according to the plane of polarization of the incident light beam. Besides, the beam splitter M2 reflects a part of the incident light beam in the right-angle direction and also allows a part of the incident light beam to travel in a straight line.

In response to the plane of the polarization, the polarization beam splitter M1 of the prism 17 allows the reception light beam L2 to travel in a straight line, and leads it to the beam splitter M2. The beam splitter M2 reflects a part of the reception light beam L2 and causes the beam L2 to converge on the position detecting element 13 via the lens 16, and also allows the rest of the reception light beam L2 to pass through it and then converge on the light receiving element 12 via the lens 15.

The light receiving element 12 performs light-to-electric current conversion of the reception light beam L2 that is gathered by the lens 15, and generates an output signal S12, and then sends it to a photo diode (PD) light-receiving circuit 44. The PD light-receiving circuit 44 performs current-to-voltage conversion of the output signal S12 and generates an output signal S44, and then sends it to a demodulating division 45. The demodulating division 45 demodulates the output signal S44 and generates the information signal S45, and then sends it to the exterior via an output connector 46.

In transmitting light beams, the light space-transmission device 2 modulates the information signal S1 that is supplied from the exterior via an input connector 41 with the stated carrier frequency in a modulating division 42, and then outputs it to a laser-diode driving division 43, as a modulated signal S42. The laser-diode driving division 43 performs voltage-to-current conversion of the modulated signal S42 and generates the driving current S43, and then sends it to the laser diode 11; the laser diode 11 performs current-to-light conversion of the laser driving current S43, so as to send out the transmission light beam L1.

The lens 14 converts the transmission light beam L1 into parallel rays, and then sends them to the polarization beam splitter M1 included in the prism 17. The polarization beam splitter M1 reflects the transmission light beam L1 in response to the plane of polarization of the transmission light beam L1, and sends it to the light beam expander 33. The light beam expander 33 increases the luminous-flux-diameter of the transmission light beam L1 by 4 times with the lenses 34 and 35, and then sends it to the light beam expander 36 via the servo mirror 20.

The light beam expander 36 further increases the luminous-flux-diameter of the transmission light beam L1 by 4 times with the lenses 37 and 38, and then emits it to a light space-transmission device of the partner. In this manner, the light space-transmission device 2 increases the luminous-flux-diameter of the transmission light beam L1 by 16 times with the light beam expander 33 and the light beam expander 36, and then throws the beam L1 out.

In this way, the light space-transmission device 2 transmits and receives the information signal via the transmission light beam L1 and the reception light beam L2.

In accordance with another embodiment of the present invention, the light space-transmission device 2 aligns the optical axes of the transmission light beam L1 and the reception light beam L2, and thereby performs optical-axis correction such that the optical axis of the transmission light beam L1 coincides with the light space-transmission device of the partner. The position detecting element 13 receives the reception light beam L2 that is condensed by the lens 16, and generates a position signal S13 having a current level that is responsive to the center position of the intensity of the reception light beam L2 at the light receiving plane of the position detecting element 13, and then sends it to a PSD light receiving circuit 47. The PSD light receiving circuit 47 performs current-to-voltage conversion of the position signal S13, and then sends it to the CPU 48.

The CPU 48 calculates the focus position of the reception light beam L2 in the light receiving plane of the position detecting element 13 by the use of the position signal S13, controls the servo mirror 20 such that the focus position of the reception light beam L2 coincide with the stated reference point of focus, and thereby controls the optical axes of the reception light beam L2 and the transmission light beam L1 that enters in or goes out from the light space-transmission device 2 such that they coincide with each other. That is, the CPU 48 calculates the difference in position between the focus position of the reception light beam L2 in the light receiving plane of the position detecting element 13 and the stated reference point of focus on the basis of the voltage of the position signal S13, and sends a driving signal S48 that is responsive to such a difference in position to an actuator driving division 24. The actuator driving division 24 drives the actuator 22 in response to the driving signal S48, so as to rotate the mirror 21. By rotating the mirror 21, the focus position of the reception light beam L2 is moved to the reference point of focus.

In the above configuration, the light space-transmission device 2 increases the luminous-flux-diameter of the transmission light beam L1 by 16 times by means of the light beam expander 33 and the light beam expander 36, each has the enlargement ratio of 4, and then sends the beam L1 to the light space-transmission device of the partner. At this time, the light space-transmission device 2 controls the angle of the mirror 21 equipped in the servo mirror 20, and thereby performs optical-axis correction such that the optical axis of the transmission light beam L1 coincides with the light space-transmission device of the partner. The servo mirror 20 is placed between the light beam expander 33 and the light beam expander 36; the servo mirror 20 corrects the optical axis of the transmission light beam L1 that is delivered from the light beam expander 33, so as to throw it to the light beam expander 36.

The angle of the light that is emitted from the light beam expander becomes a value that is given by dividing the angle of the light thrown into the light beam expander by the enlargement ratio of the light beam expander. When the angle range of the transmission light beam L1 required for the light space-transmission device 2 is ±1 degree, the angle range of the transmission light beam L1 that is thrown into the light beam expander 33 becomes ±4 degrees, therefore, the rotational angle range that is required for the mirror 21 becomes ±2 degrees.

According to the above configuration, the light beam expander, which has the enlargement ratio of 16 as a whole, for increasing the luminous-flux-diameter of the transmission light beam L1 is divided into two stages of the light beam expander 33 and the light beam expander 36 that have the enlargement ratio of 4 respectively, and the servo mirror 20 is provided between the light beam expander 33 and the light beam expander 36. As a result, it is able to reduce the rotational angle range of the mirror 21 by a factor of 4 in comparison with the case where a single stage of light beam expander having the enlargement ratio of 16 is utilized, and also able to simplify and miniaturize the configuration of the servo mirror 20.

In the above-mentioned embodiment, the light beam expander is divided into two stages and the servo mirror is placed between them, so that the rotational angle range of the mirror 21 can be reduced; however, the present invention is not limited to such, and it is possible to increase the angle range of the transmission light beam. That is, in the case where the light beam expander is divided into two stages while the rotational angle range of the servo mirror is not changed, it is able to increase the angle range of the transmission light beam in comparison with that of single-stage light beam expander, and to relax the setting conditions of the light space-transmission device.

The light beam expander is divided into two stages and the servo mirror is placed between them in the above-mentioned embodiment so as to reduce the rotational angle range of the mirror 21, the present invention is not limited to such; it is also possible to increase the enlargement ratio of the light beam, on the basis of two-stage light beam expander. In this case, if the luminous-flux-diameter of the transmission light beam that is thrown to the light space-transmission device of the partner is the same, it is able to diminish the diameter of the transmission light beam that is emitted from the optical block, and, therefore, it is able to miniaturize the optical block.

The light beam expander is formed by the combination of a concave lens and a convex lens in the above-mentioned embodiment, the present invention is not limited to such; it is possible to use a light beam expander that is formed by a combination of a convex lens and a convex lens.

The servo mirror is used as the optical-axis correcting means in the above-mentioned embodiment, the present invention is not limited to such; it is possible to use other various optical-axis correcting means, such as a variable-optical-axis prism.

As described above, the present invention provides transmitting means for transmitting a light beam modulated with a predetermined information signal to another light space-transmission device spaced out at a predetermined distance, light receiving means for receiving a transmission light transmitted from another light space-transmission device spaced out at a predetermined distance as a reception light beam, a plurality of luminous-flux-diameter converting means for converting the luminous-flux-diameters of said transmission light beam and said reception light beam, optical axis correcting means for controlling the angle of the optical axes of said transmission light beam and said reception light beam; therefore, it is able to diminish the rotational range of the optical-axis correcting means, and to realize a light space-transmission device that has a simple configuration and a wide optical-axis correcting range.

While there has been described the preferred embodiments of the invention, it will be obvious to those skilled in the art that various modifications and substitutions may be made without departing from the true spirit and scope of the invention, which should be determined from the appended claims.

What is claimed is:

1. A light space-transmission device comprising:

transmitting means for transmitting a light beam modulated with a predetermined information signal to another light space-transmission device spaced at a predetermined distance;

light receiving means for receiving a transmission light transmitted from another light space-transmission device spaced at a predetermined distance as a reception light beam;

a plurality of stationary luminous-flux-diameter converting means for converting the luminous-flux-diameters of said transmission light beam and said reception light beam; and optical axis correcting means for controlling the optical axes of said transmission light beam and said reception light beam by changing an angle of reflection of said transmission light beam and said reception light beam from said optical axis correcting means.

2. The light space-transmission device according to claim 1, wherein each of said plurality of said luminous-flux-diameter converting means converts the luminous-flux-diameter of said transmission light beam and said reception light beam by a respective predetermined magnification.

3. The light space-transmission device according to claim 1, wherein a plurality of said luminous-flux-diameter converting means for converting the luminous-flux-diameters of said transmission light beam and said reception light beam, each performs enlargement conversion of the luminous-flux-diameter for a transmission beam, and each performs diminishing conversion of the luminous-flux-diameter for a reception beam.

4. The light space-transmission device according to claim 1, wherein said optical axis correcting means for controlling the optical axes of said transmission light beam and said reception light beam is inserted into an optical path of said plurality of said luminous-flux-diameter converting means.

5. A light space-transmission device comprising:

transmitting means for transmitting a light beam modulated with a predetermined information signal to another light space-transmission device spaced at a predetermined distance;

light receiving means for receiving a transmission light transmitted from another light space-transmission device spaced at a predetermined distance as a reception light beam;

two stationary luminous-flux-diameter converting means for converting the luminous-flux-diameters of said transmission light beam and said reception light beam; and optical axis correcting means for controlling the optical axes of said transmission light beam and said reception light beam by changing an angle of reflection of said transmission light beam and said reception light beam from said optical axis correcting means.

6. The light space-transmission device according to claim 5, wherein said two luminous-flux-diameter converting means for converting the luminous-flux-diameters of said transmission light beam and said reception light beam converts the luminous-flux-diameter by respective magnifications.

7. The light space-transmission device according to claim 5, wherein said two luminous-flux-diameter converting means for converting the luminous-flux-diameters of said transmission light beam and said reception light beam, each performs enlargement conversion of the luminous-flux-diameter for a transmission beam, and each performs diminishing conversion of the luminous-flux-diameter for reception beam.

8. The light space-transmission device according to claim 5, wherein said optical axis correcting means for controlling the optical axes of said transmission light beam and said reception light beam is inserted into an optical path of said two luminous-flux-diameter converting means.

* * * * *